US006909208B2

United States Patent
Suzuki et al.

(10) Patent No.: US 6,909,208 B2
(45) Date of Patent: Jun. 21, 2005

(54) STATOR SUB-ASSEMBLY, STATOR ASSEMBLY, MOTOR AND MANUFACTURING METHOD OF STATOR ASSEMBLY

(75) Inventors: Yuzuru Suzuki, Shizuoka (JP); Taketoshi Ohyashiki, Shizuoka (JP)

(73) Assignee: Minebea Co., Ltd., Nagano (JP)

( * ) Notice: Subject to any disclaimer, the term of this patent is extended or adjusted under 35 U.S.C. 154(b) by 99 days.

(21) Appl. No.: 10/653,320

(22) Filed: Sep. 2, 2003

(65) Prior Publication Data

US 2004/0041495 A1 Mar. 4, 2004

(30) Foreign Application Priority Data

Sep. 2, 2002 (JP) ........................................ 2002-257199
Apr. 23, 2003 (JP) ........................................ 2003-118825

(51) Int. Cl.⁷ .......................... H02K 37/14; H02K 3/46; H02K 5/22; H02K 37/24
(52) U.S. Cl. ...................... 310/49 R; 310/71; 310/257
(58) Field of Search .............................. 310/49 R, 71, 310/42, 254, 257; 29/596–598

(56) References Cited

U.S. PATENT DOCUMENTS

| 4,924,124 | A | * | 5/1990 | Kato ............................ 310/43 |
| 5,004,941 | A | | 4/1991 | Ohzeki et al. |
| 5,770,900 | A | * | 6/1998 | Sato et al. ................. 310/49 R |
| 5,845,390 | A | | 12/1998 | Cheng et al. |
| 6,744,156 | B2 | * | 6/2004 | Doi .......................... 310/49 R |

FOREIGN PATENT DOCUMENTS

| EP | 0289043 A1 | 11/1988 |
| EP | 0412569 A1 | 2/1991 |
| EP | 0774824 A1 | 5/1997 |
| EP | 0896416 A1 | 2/1999 |
| JP | 61-189146 | 8/1986 |
| JP | 05-064411 | 3/1993 |
| JP | 5176491 | * 7/1993 ................... 310/71 |

* cited by examiner

*Primary Examiner*—Tran Nguyen
(74) *Attorney, Agent, or Firm*—Townsend and Townsend and Crew LLP

(57) ABSTRACT

A stator sub-assembly comprises: a coil bobbin which is composed of a cylinder having a winding of a magnet wire therearound, and a terminal block provided with terminal pins connected to lead wires of the winding and coupled stator yokes housing said coil bobbin therein and having a cutout for allowing the terminal block to protrude therethrough. The cutout has a width adapted to allow the terminal block to circumferentially shift rotationally about the center of an axial direction of the coil bobbin.

11 Claims, 10 Drawing Sheets

STATOR SUB-ASSEMBLY, STATOR ASSEMBLY, MOTOR AND MANUFACTURING METHOD OF STATOR ASSEMBLY

BACKGROUND OF THE INVENTION

1. Field of the Invention

The present invention relates to a stator sub-assembly, a stator assembly, a motor using the same, and a manufacturing method of the stator assembly.

2. Description of the Related Art

A stepping motor has been extensively used as a motor used for a rotating component and the like of an OA apparatus or an automobile. The stepping motor converts a digital electric input into a mechanical motion in response to electric signals and rotates stepwise by a fixed angle for each step, thus attaining a high accuracy in positioning. One type of such a stepping motor is a PM (permanent magnet) stepping motor using a permanent magnet in a rotor section thereof.

A conventional PM stepping motor is provided with a stator assembly 100 as shown in FIG. 10. The stator assembly 100 comprises two stator subassemblies 101 and 101 attached back to back.

FIG. 11 shows an exploded view of one of the two stator subassemblies 101 and 101. The stator sub-assembly 101 comprises a cylindrical cup-shaped outer stator yoke 102, an inner stator yoke 103 made of a ring-shaped steel plate and a winding 104.

The outer stator yoke 102 and the inner stator yoke 103 are formed such that after punching out their respective soft magnetic materials, their respective plurality of pole teeth 102a and 103a are intermeshed, with a gap. The winding 104 is formed by winding a magnet wire W around a flanged bobbin 105 made of plastic resin The flanged bobbin 105 includes a terminal block 107 protruding from its cylindrical flange substantially perpendicularly to its axial direction, and has a plurality of terminal pins 106 projecting from the terminal block 107 and fixed thereto. Lead wires of the winding 104 are hooked around the terminal pins and soldered. The terminal pins 106 are connected to a driving circuit of an apparatus on which the stepping motor is mounted.

A cutout 102b is formed in the outer stator yoke 102 in order to allow the terminal block 107 protrude outward. Referring to FIG. 12, a width of the cutout 102b is set to be substantially equal to a width of the terminal block 107, thereby securely fixing the winding 104 within coupled stator subassemblies 101 and 101.

The stator assembly 100 is formed such that the two stator subassemblies 101 and 101 each having the above-described structure are, for example, resin-molded with one another with their respective inner yokes in contact. Here, the two stator subassemblies 101 and 101 are coupled such that their respective plurality of pole teeth are misaligned by an optical electrical angle, for example, 90 degrees.

However, when the stator assembly 100 is structured as described above, a displacement in a relative electrical angle between the two kinds of pole teeth has to be adjusted, causing a dislocation between the two terminal blocks opposite to each other to occur as shown in FIG. 11. Consequently, it is difficult or complicated to make a smooth electrical connection between the stepping motor provided with the above-described stator assembly 100 and an apparatus on which the stepping motor is mounted.

For example, in case of connecting the terminal pins 106 with a flexible printed circuit (FPC) 109 having connection holes 108 as shown in FIG. 12, it is necessary to make such a special design as to boring rather big connection holes due to the dislocation between the two terminal blocks opposite to each other. However, enlarging the connection holes involves defects such as incomplete soldering, thereby diminishing the reliability of soldering.

In brief, the conventional stator assembly 100 has a defect in that the dislocation between the two terminal blocks 107 and 107 opposite to each other can occur, causing the defects of the electrical connection between the motor having the stator assembly 100 and the apparatus on which the motor is mounted, eventually diminishing the manufacturing reliability of the stator assembly and the motor.

SUMMARY OF THE INVENTION

The present invention has been made in the light of the above, and its object is to provide a stator sub-assembly, a stator assembly, and a motor which allow them to have their respective smooth electrical connections with an apparatus on which they are mounted and also to provide a method of manufacturing a highly-reliable stator.

In order to achieve the above object, according to a first aspect of the present invention, a stator sub-assembly comprises:

a coil bobbin composed of a cylinder having a winding. of a magnet wire therearound, and a terminal block provided with terminal pins connected to lead wires of the winding; and coupled stator yokes housing the coil bobbin therein and having a cutout for allowing the terminal block to protrude therethrough, the cutout having a width adapted to allow the terminal block to circumferentially shift rotatably about a center of an axial direction of the coil bobbin.

In the first aspect of the present invention, a first angle made by two radii connecting a center of the coupled stator yokes to both circumferential ends of the terminal block may be set to be smaller than a second angle made by two radii connecting the center of the coupled stator yokes to both circumferential ends of the cutout.

In the first aspect of the present invention, the first angle may be set to be smaller than the second angle by an electrical angle of at least 10 degrees.

According to a second aspect of the present invention, a stator assembly comprises two stator subassemblies, wherein the two stator subassemblies each comprise: a coil bobbin composed of a cylinder having a winding of a magnet wire therearound, and a terminal block provided with terminal pins connected to lead wires of the winding; and coupled stator yokes housing the bobbin therein and having a cutout for allowing the terminal block to protrude therethrough, the cutout having a width adapted to allow the terminal block to circumferentially shift rotationally about a center of an axial direction of the coil bobbin; and the two stator sub-assemblies are disposed such that respective terminal blocks of the two stator sub-assemblies abut on each other.

In the second aspect of the present invention, a first angle made by two radii connecting a center of the coupled stator yokes to both circumferential ends of the terminal block may be set to be smaller than a second angle made by two radii connecting the center of the coupled stator yokes to both circumferential ends of the cutout.

In the second aspect of the present invention, the first angle may be set to be smaller than the second angle by an electrical angle of at least 10 degrees.

In the second aspect of the present invention, the respective terminal blocks of the two stator sub-assemblies may be positioned so as to be circumferentially overlapped each other.

In the second aspect of the present invention, the terminal block may have a positioning mechanism.

In the second aspect of the present invention, respective coupled stator yokes of the two stator sub-assemblies may be disposed such that respective pole teeth of the respective coupled stator yokes are misaligned relative to each other by a predetermined electrical angle.

According to a third aspect of the present invention, a motor has a stator assembly according to the second aspect of the present invention.

According to the fourth aspect of the present invention, a method of manufacturing a stator assembly includes two stator sub-assemblies each comprising: a coil bobbin composed of a cylinder having a winding of a magnet wire therearound and a terminal block provided with terminal pins connected to lead wires of the winding; and coupled stator yokes housing the coil bobbin therein and having a cutout for allowing the terminal block to protrude therethrough, the method comprising:

a process in which the two stator sub-assemblies are superimposed back-to-back such that respective coupled stator yokes of the two stator sub-assemblies are disposed in a predetermined relative position, with respective terminal blocks of the two stator sub-assemblies abutting on each other; and a process in which the respective terminal blocks are positioned so as to be circumferentially overlapped with each other in a state of the respective coupled stator yokes being fixedly attached each other.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

Preferred embodiments of the present invention will hereinafter be explained with reference to the accompanying drawings.

In the following preferred embodiments, a PM stepping motor using a permanent magnet and used as a rotating component or the like of an OA apparatus or an automobile will be discussed as an example.

Figure 1:
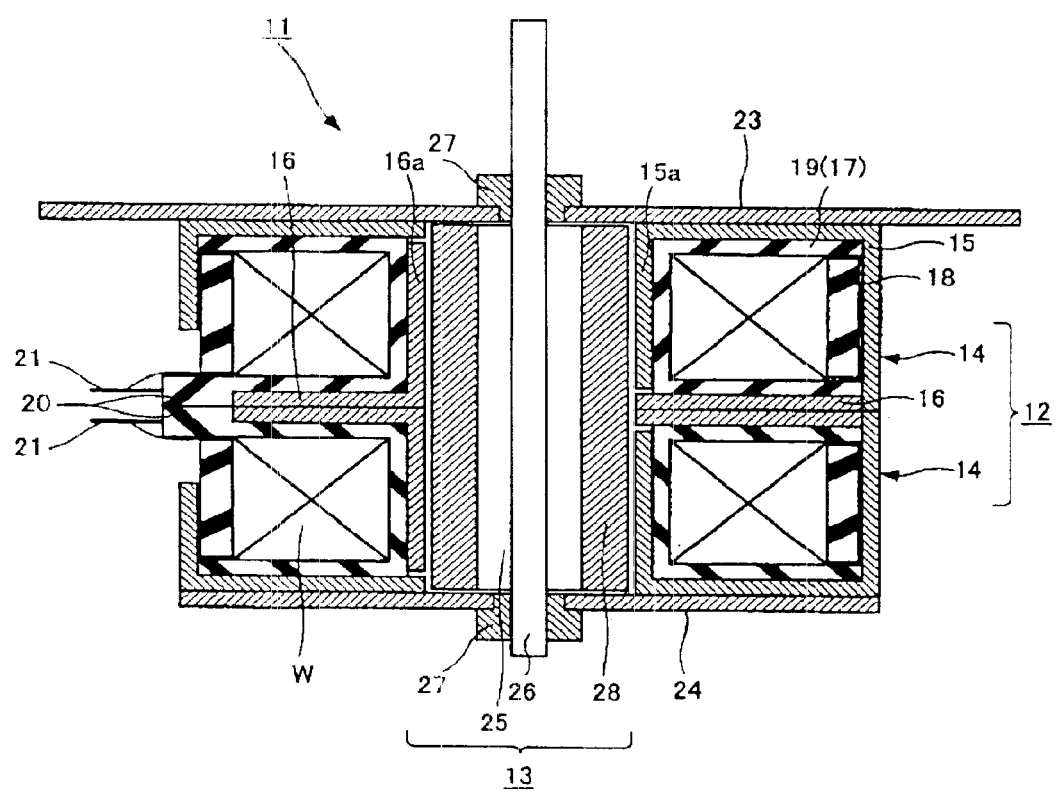
FIG. 1 shows a cross-sectional structure of a stepping motor according to an embodiment of the present invention.

FIG. 1 shows a cross-sectional structure of a stepping motor 1 generally comprising a stator assembly 12 and a rotor assembly 13.

Figure 2:
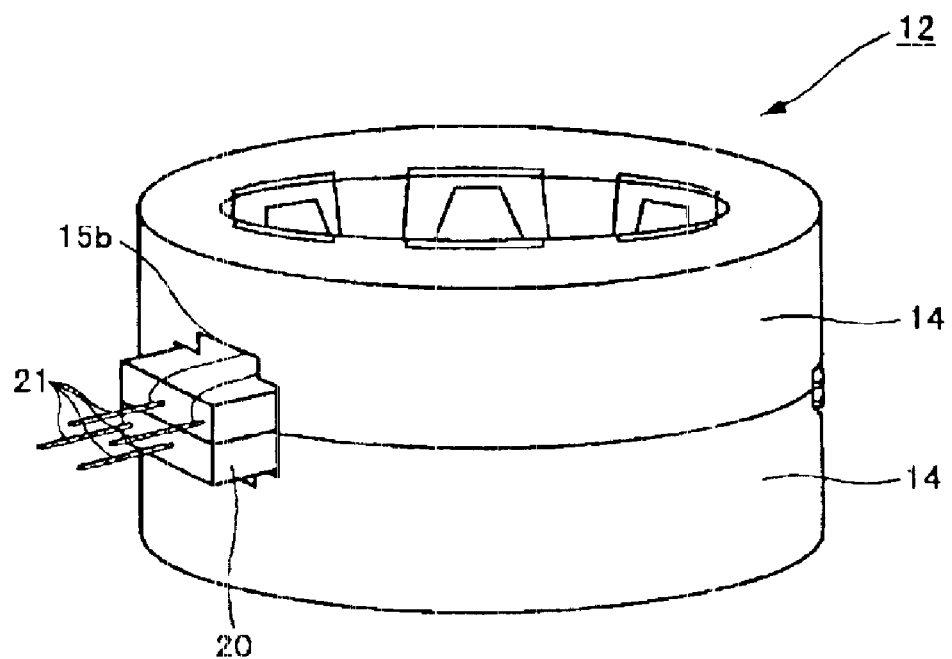
FIG. 2 shows a perspective view of a stator assembly shown in FIG. 1.
Figure 3:
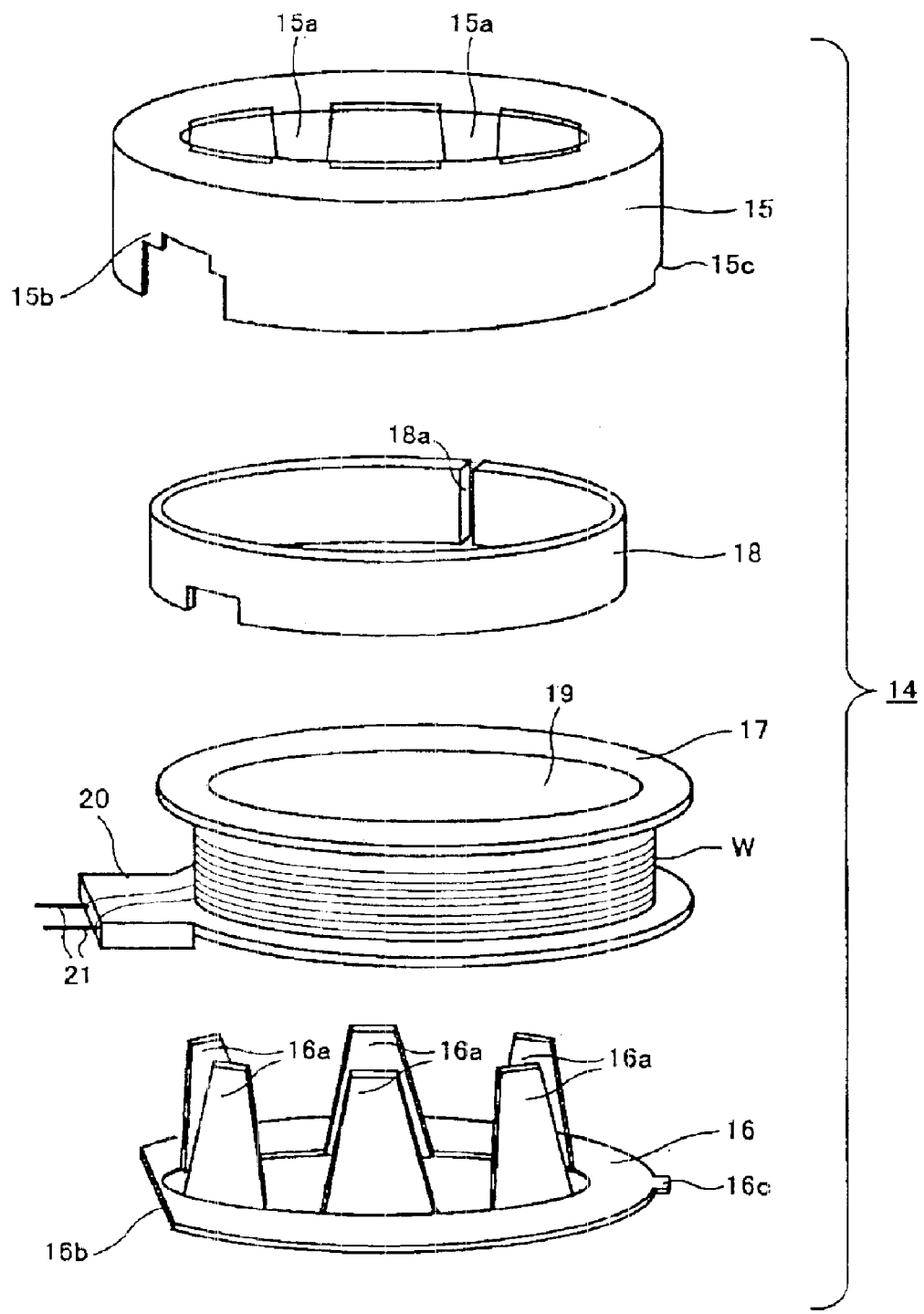
FIG. 3 shows an exploded view of a stator subassembly shown in FIG. 2.

Referring to FIG. 2, the stator assembly 12 is formed such that two stator subassemblies 14 and 14 are superimposed back to back. As shown in an exploded view of FIG. 3, the stator subassembly 14 comprises an outer stator yoke 15, an inner stator yoke 16, a coil bobbin 17 and a cover ring 18.

The outer stator yoke 15 constitutes a periphery and top surface of the stator subassembly 14, and is made of a cup-shaped, cylindrical soft magnetic steel plate, and has a plurality of first pole teeth 15a formed along its an inner circumference and bent up, and has a cutout 15b formed in its outer circumferential wall. The first pole teeth 15a are formed by bending the soft magnetic steel plate, and are set to be equidistant from one another at a predetermined electrical angle.

A cutout 15b is formed in a side wall of the outer stator yoke 15 and is adapted to allow a terminal block 20 of a coil bobbin 17 to protrude therefrom. The terminal block 20 will be later described in detail. The outer stator yoke 15 also has a positioning notch 15c.

The inner stator yoke 16 is made of a soft magnetic steel plate or the like and is a ring-shaped plate whose outer diameter is substantially equal to an inner diameter of the outer stator yoke 15. The inner and outer stator yokes are arranged such that they are substantially concentric with each other, and the inner stator yoke 16 is accommodated in an open space of the outer stator yoke 15 in such a manner as to constitute a bottom surface of the stator subassembly 14.

An inner circumference of the inner stator yoke 16 has the same diameter as that of the outer stator yoke 15. A plurality of second pole teeth 16a are formed on an inner circumferential side of the inner stator yoke 16, by bending the soft magnetic steel plate, and are set to be equidistant one another at a predetermined electrical angle.

Figure 4:
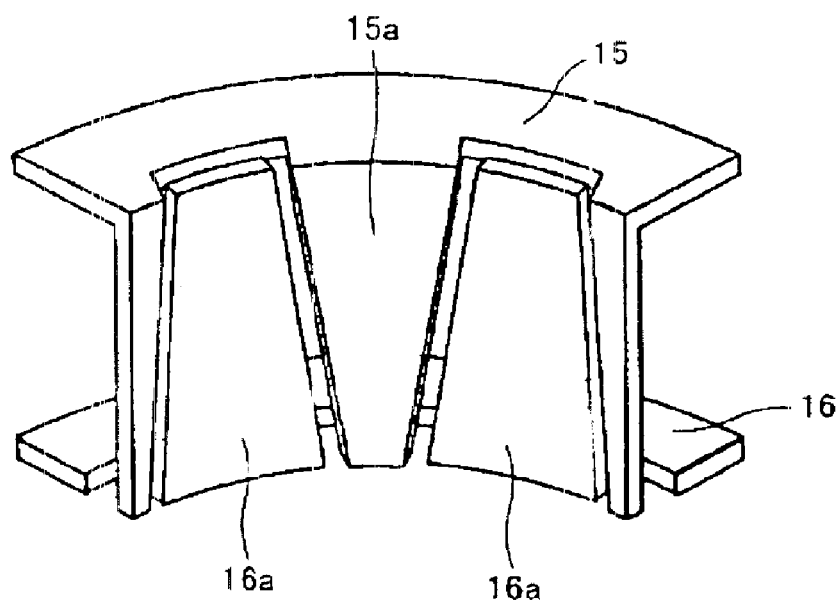
FIG. 4 shows a partial illustration of a coupling state of an outer stator yoke and an inner stator yoke.

The first and second pole teeth 15a and 16a are intermeshed with a gap in a state that the outer and inner stator yokes 15 and 16 are properly positioned and coupled. FIG. 4 shows a partial illustration of that coupling state.

Referring back to FIG. 3, a chamfered edge 16b is formed, by cutting off a plano-convex portion from a ring-shaped circumferential portion of the inner stator yoke 16. And, the chamfered edge 16b has a substantially rectangular surface and it is close to a terminal block 20 of the coil bobbin 17.

A positioning projection 16c is formed at a point on the opposite to the chamfered edge 16b on a circumferential side portion of the inner stator yoke 16. The positioning projection 16c is adapted to engage with a positioning notch 15c of the outer stator yoke 15, so that the outer and inner stator yokes 15 and 16 are positioned correctly and securely and coupled with each other.

The coil bobbin 17 is made of, for example, a plastic material and consists of a bobbin body 19 and the terminal block 20.

The bobbin body 19 is substantially cylindrical with its cross-section in a shape of a letter H, and it has a magnet wire W wound therearound in many turns. The many turns of the magnet wire W wound around the bobbin body 19 make a coil.

The bobbin body 19 is disposed around the first and second pole teeth 15a and 16a such that it is concentric with the outer and inner stator yokes 15 and 16.

The terminal block 20 is formed continuously from an inner flange in such a manner as to protrude outward with a predetermined width for predetermined length so as to be shaped substantially rectangular. The terminal block 20 protrudes, with a predetermined width, outwardly from the bobbin body 19, and it is substantially rectangular. The terminal block 20 has a certain thickness for housing terminal pins in the axial direction of the bobbin body 19. With the inner stator yoke 16 received in the coil bobbin 16, the chamfered edge 16b of the inner stator yoke 16 is shaped to fit an elevated portion of the terminal block 20, thereby functioning as a means for positioning the terminal block 20 to slackly engage therewith.

As explained in detail later, the slack engagement means that the coil bobbin 17 and the inner stator yoke 16 can rotate stepwise to a certain extent in their circumferential direction, A height of a lower elevation of the terminal block 20 is set to be substantially equal to a thickness of the inner stator yoke 16. With the chamfered edge 16b of the inner stator yoke 16 slackly engaging with the terminal block 20, the terminal block 20 shares substantially the same plane (one surface of the stator subassembly 14) with the inner stator yoke 16.

The terminal block 20 has an external sidewall substantially perpendicular to the axial direction of the bobbin body 19 and two terminal pins 21 and 21 each being a bar-like piece made of a conductive metal are fixed to the external sidewall of the in such a manner as to be erected substantially perpendicular to thereto.

Both ends of the magnet wire W wound around the bobbin body 19, that is, lead-out wires each extend on a top major surface terminal block 20, reach the terminal pins 21 and 21, and are caught and soldered thereon.

The terminal pins 21 are adapted to be inserted into connection holes or the like in a PCB (printed circuit board) or an FPC (flexible printed circuit), so that electricity can be supplied to the magnet wire W via the terminal pins 21, thus generating magnetic flux from the coil bobbin.

Figure 5:
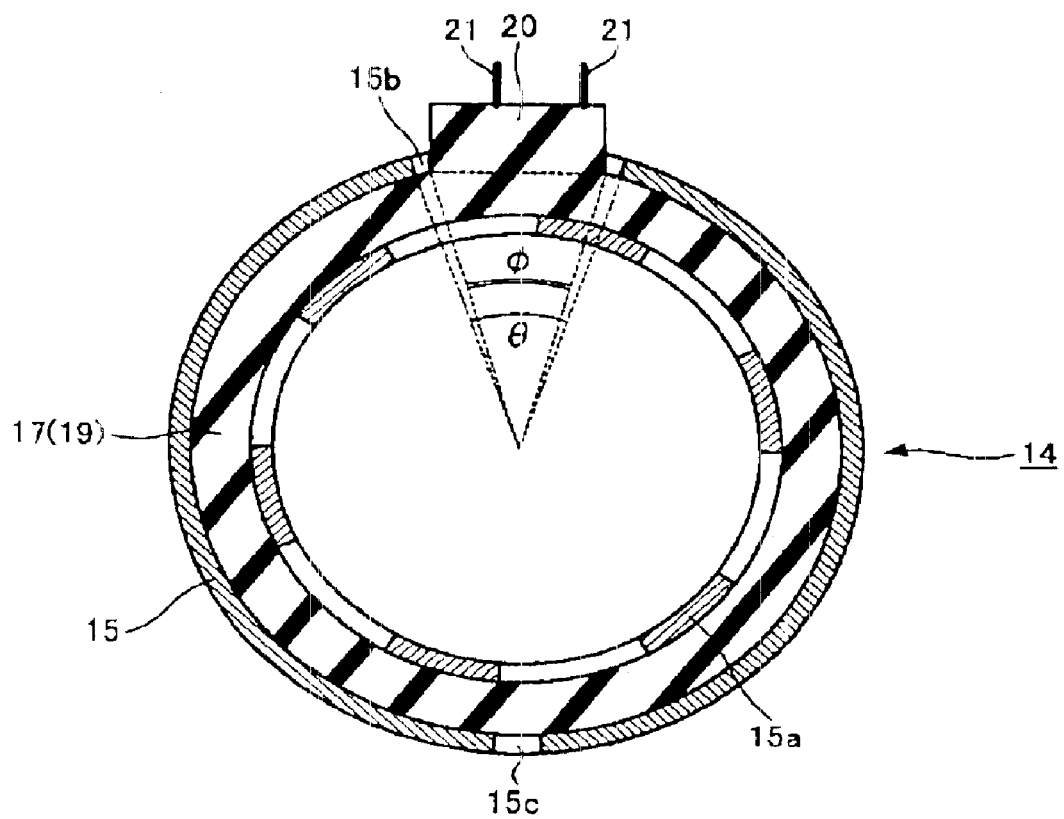
FIG. 5 shows a sectional view of the stator assembly shown in FIG. 2 taken along an abutting contact surface of the two stator subassemblies with the outer stator yoke housed in a coil bobbin.

FIG. 5 shows a sectional view of the stator assembly shown in FIG. 2 taken along an abutting contact surface of the two stator subassemblies 14 and 14 with the outer stator yoke housed in a coil bobbin.

An angle ϕ made by two radii connecting a center of the outer stator yoke with two points on a minor arc of the terminal block to be housed in the cutout 15b is set to be smaller than an angle θ of the cutout 15 b. For example, the angle θ is set at 44 degrees of mechanical angle and the angle ϕ 40 degrees of mechanical angle. Most favorably, the angle ϕ is set to be smaller than the angle θ by an electrical angle of 10 degrees or more.

As to the motor of the present invention, since a number of its magnetic poles is six, 360/6 degrees of mechanical angle is equivalent to 360 degrees of electrical angle. Therefore, since the most favorable angle ϕ depends on a number of magnetic poles of the concerned motor, it is preferable to use its electrical angle.

Consequently, by setting the angle ϕ of the terminal block 20 to be smaller than the angle θ of the cutout 15b, a gap is generated between the terminal block 20 and inner walls of the cutout 15b, with the terminal block 20 protruding from the cutout 15b. Therefore, as the coil bobbin moves, the terminal block 20 can move at a predetermined angle, that is, an angle produced by the generated gap, in a circumferential direction of the coil bobbin 17.

The terminal block 20 capable of rotating in the circumferential direction of the coil bobbin 17 eliminates a dislocation between the two terminal blocks 20 and 20 with the two stator yokes 15 and 16 superimposed at their respective predetermined positions in an assembly process of the stator assembly 12, which will be mentioned in detail later.

Referring back to FIG. 3, the cover ring 18 is made of an elastic material such as a plastic material which is a cylindrical material having its predetermined width and thickness. A diameter of the cover ring 18 is equal to or shorter than that of the coil bobbin 17 formed of wiring of the magnet wire W. The cover ring 18 has a slit 18a at an end of its circumference, and the slit 18a is adapted such that the cover ring 18 can easily cover the coil bobbin with the use of an elasticity thereof.

The width of the cover ring 18 is set to be the same as or a little shorter than a distance between inner sides of the two flanges of the coil bobbin. Consequently, the cover ring 18 press-fitted in the coil bobbin 17 is adapted to cover and protect wirings of a magnet wire W.

Referring back to FIGS. 1 and 2, the stator assembly 12 in the stepping motor 11 is formed such that the two stator subassemblies 14 and 14 each with the above-described structure are superimposed back to back with their respective terminal blocks 20 and 20 adjacent to each other. The two stator subassemblies 14 and 14 are resin-molded with each other, which will be described in detail later.

Major surfaces not in contact with each other of the two superimposed stator subassemblies 14 and 14 are fixed, by projection welding or the like, to a first and second flanges 23 and 24, which have been already formed each by punching out a stainless steel plate.

The rotor assembly 13 comprises a shaft 26 press-fitted in a metallic holder 25, bearings 27 and 27 fixed by caulking or the like to the fist and second flanges 23 and 24 and rotatably holding the shaft 26, and a magnet 28 disposed around an outer circumferential wall of the holder 25. The magnet 28 is fixed by bonding or insertion molding such that it is concentric with the shaft 26 and is also concentric with and faces both the pole teeth 15a and 16a with a slight air gap. The magnet 28 is magnetized on its circumferential surface along the circumferential direction with a plurality of alternating N- and S-poles having a preset width. When a predetermined pulse driving voltage is applied on the windings in the stator assembly 12, the first pole teeth 15a are magnetized, for example, with S-pole. Consequently, N-poles in the surface of the magnet 28 are drawn toward the first pole teeth 15a. In this manner, the rotor 13 moves by a predetermined angle.

How to assemble the stepping motor with the above-described structure will be hereinafter explained. The shaft 26 is forcibly inserted into the holder 25, and the magnet 28 is fixed around the holder 25, constituting the rotor assembly 13.

The stator assembly 12 is structured as described below. The coil bobbin 17 is formed by winding a magnet wire W around the bobbin body 19. A diameter, a number of turns, a length, etc. of the magnet wire W depend on applications of the stepping motor 11. The cover ring 18 covers the coil bobbin 17. The stator subassembly 14 is formed such that the inner and outer stator yokes 16 and 15 are coupled together in such a manner as to sandwich the coil bobbin 17 covered by the cover ring 18. Here, the terminal block 20 of the coil bobbin 17, the cutout 15b of the outer stator yoke 15 and the chamfered edge 16b are disposed in such a manner as to mate with one another.

Then, using a predetermined holding jig, the two stator subassemblies 14 and 14 are correctly positioned such that their respective inner stator yokes 16 and 16 abut back to back. Alternatively, the holding jig may be used so as to directly hold each component of the two stator subassemblies 14 and 14 in their respective assembly sequence.

The two stator subassemblies 14 and 14 are superimposed such that the pole teeth of their respective stator yokes 15 and 16 are misaligned, each having an optimum difference in an electrical angle, for example, of 90 degrees.

With the above-described structure of the two stator subassemblies 14 and 14, their respective terminal blocks 20 and 20 have to be fittingly positioned with respect to one another. For example, there are several mechanisms for achieving the fitting positioning of the coil blocks 20 and 20 as shown in FIGS. 6A–6D.

Figure 6A:
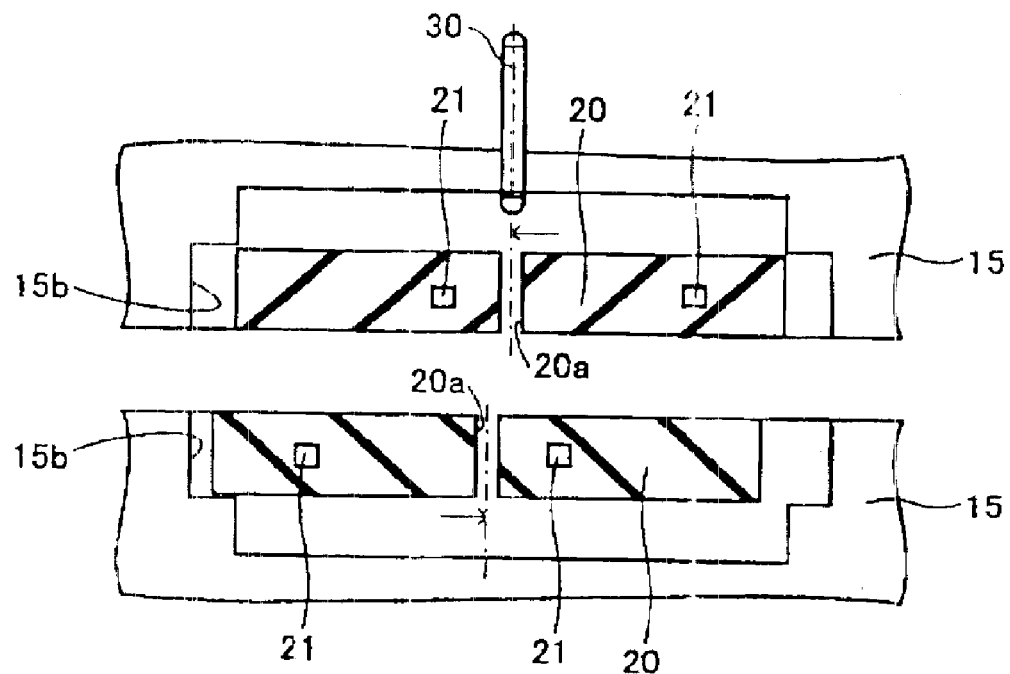
FIGS. 6A–6D show four methods of positioning a terminal block.

FIG. 6A shows a first mechanism in that positioning through-holes 20a and 20a for each of the terminal blocks 20 and 20 are bored therein in a direction substantially perpendicular to main surfaces thereof (an axial direction of the cylindrical coil bobbin 17). The positioning is carried out by inserting one positioning pin 30 into both the positioning through-holes 20a and 20a.

Figure 6B:
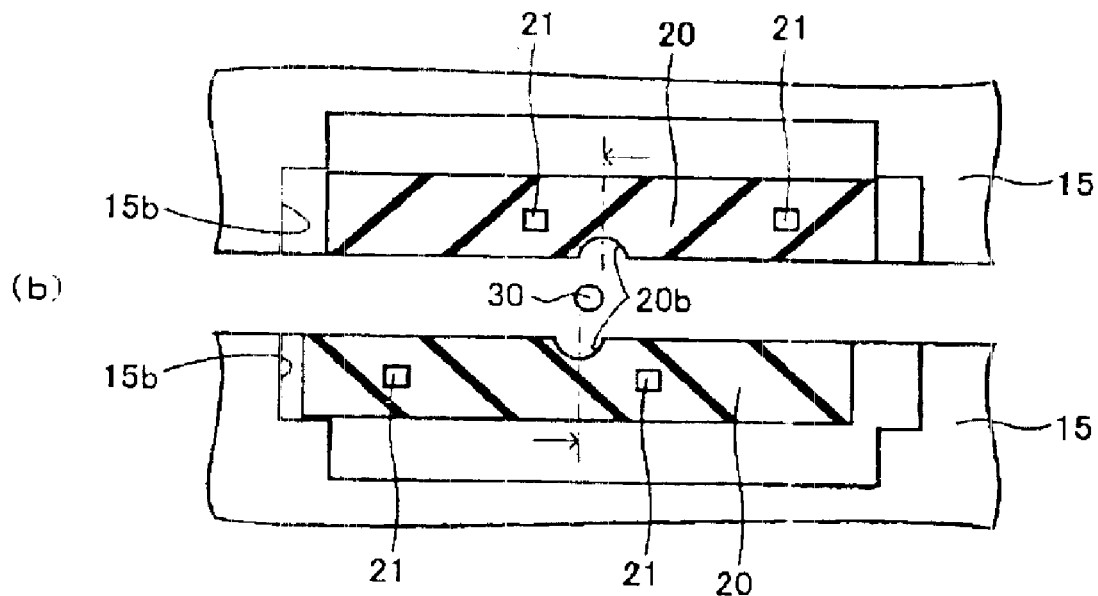

FIG. 6B shows a second mechanism in that positioning grooves 20b and 20b are cut in opposing surfaces of the two terminal blocks 20 and 20 in their protruding direction, placing the positioning grooves 20b and 20b at substantially a center of each coil block. The positioning is carried out by placing the one positioning pin 30 along both the positioning grooves with the two stator subassemblies 14 and 14 superimposed back to back.

When using the positioning mechanisms shown in FIGS. 6A and 6B, the positioning pin 30 is removed after, for example, the terminal pins 21 have been connected to a circuit board such as an FPC, which will be explained later in detail.

Figure 6C:
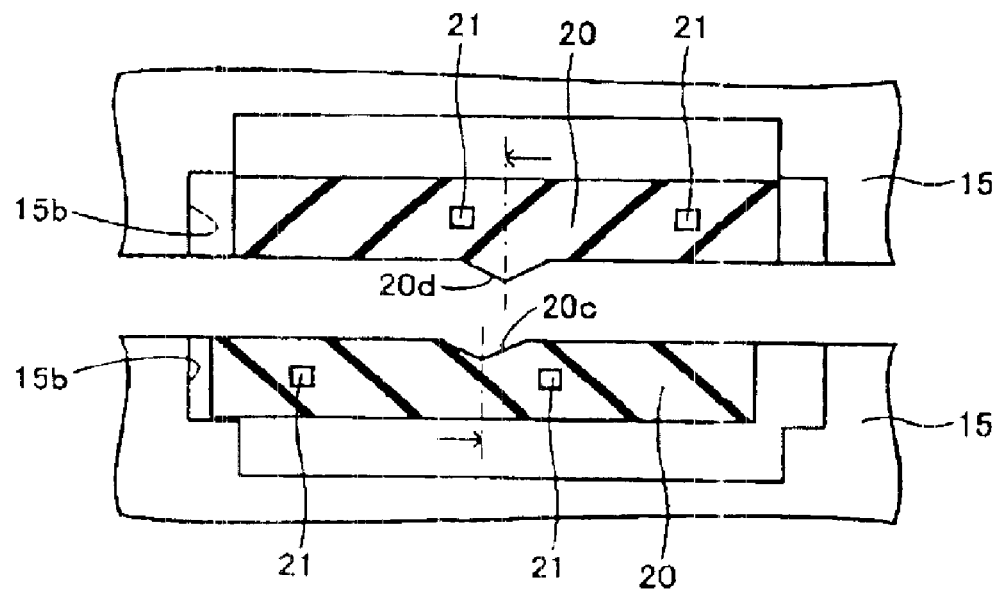

FIG. 6C shows a third mechanism in that either a V-shaped protuberance 20c or a V-shaped groove 20d in cross-section to mate with one another is formed on an opposing surface of each of the terminal blocks 20 and 20. The positioning is carried out by mating the protuberance 20c with the groove 20d.

Figure 6D:
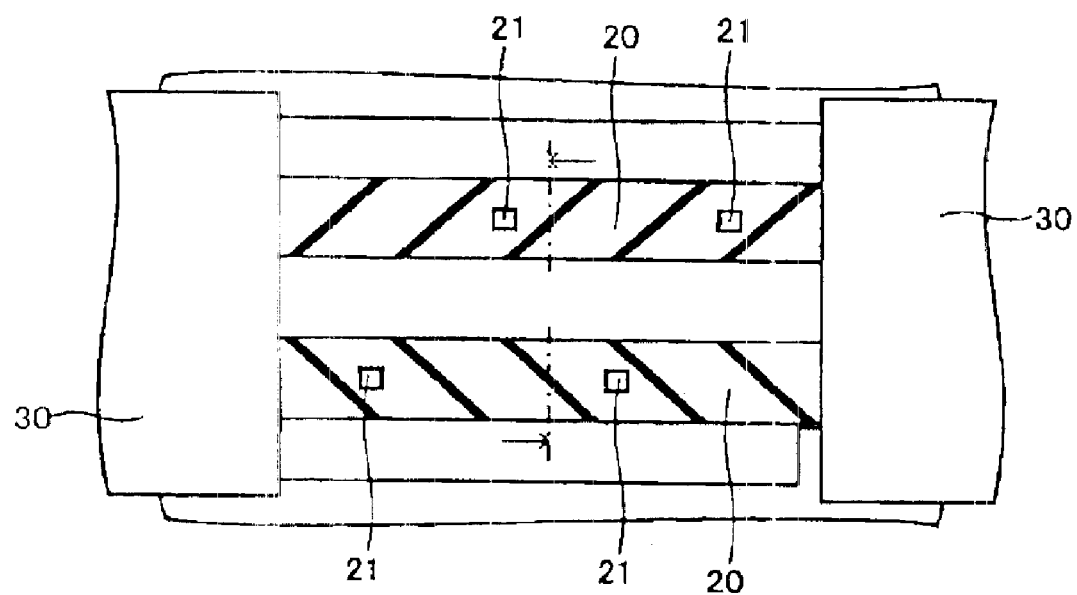

FIG. 6D shows a fourth mechanism in that a positioning jig is used for fittingly positioning the terminal blocks 20 and 20 by aligning sidewalls on the same side of the terminal blocks 20 and 20.

Figure 7:
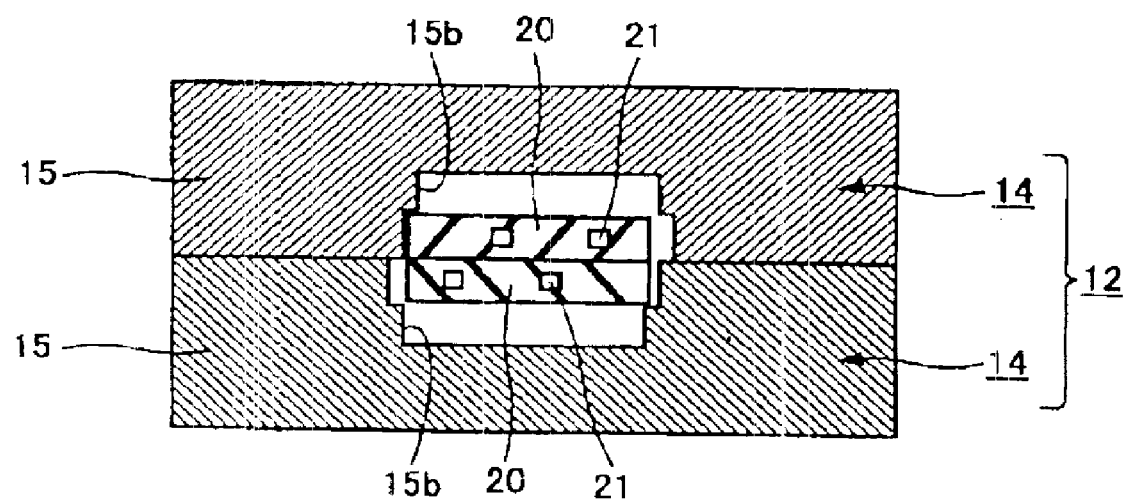
FIG. 7 shows a side view of a stator assembly in a positioned state.

FIG. 7 shows a side view of the two stator subassemblies 14 and 14 properly positioned using any one of the above-described four positioning mechanisms. Even if a displacement in relative angle between the notches 15b and 15b of the stator subassemblies 14 and 14 occurs, any one of the four positioning mechanisms can serve to eliminate the displacement in relative angle.

After that, with the outer and inner stator yokes 15 and 16 and the terminal block 20 properly positioned, the two stator subassemblies 14 and 14 are resin-molded integrally with one another to thereby form the stator assembly 12.

Then, the second flange 24 having one bearing 27 fixed, by welding or the like, thereto is fixed to one main surface of the stator assembly 12. And, the rotor assembly 13 is housed in an inner surface of the ring-shaped stator assembly 12 such that one end of the shaft 26 extends through the bearings 27 and 27. And, the first flange 23 having the other bearing 27 fixed thereto is disposed such that the other end of the shaft 26 extends through the one bearing 27, and then the other main surface of the stator assembly 12 is fixed, by welding or the like, to the first flange 23, thereby to complete the stepping motor 11 in this embodiment.

Figure 8:
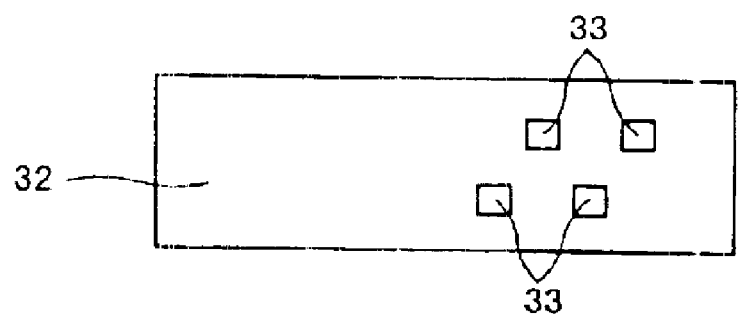
FIG. 8 shows an FPC.
Figure 9:
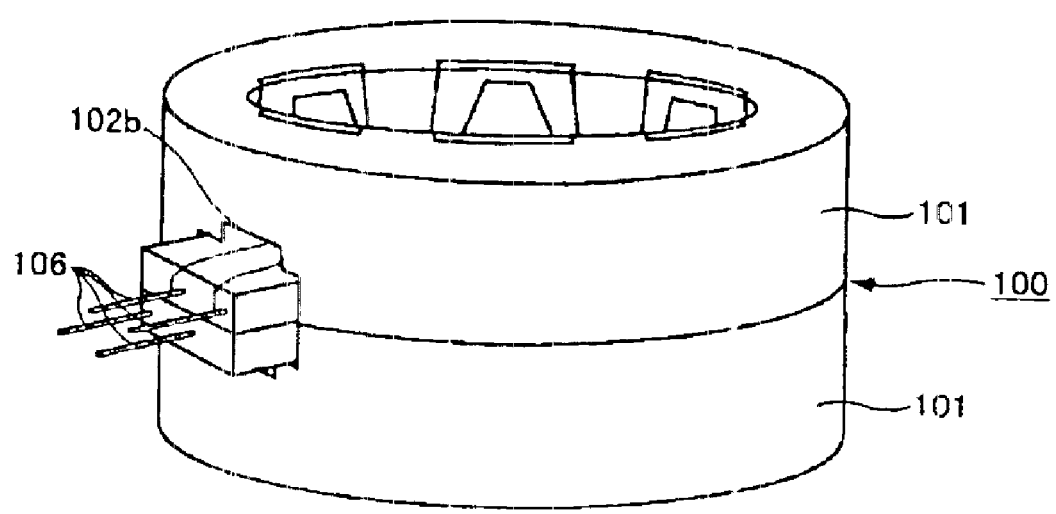
FIG. 9 shows a perspective view of a conventional stator assembly.
Figure 10:
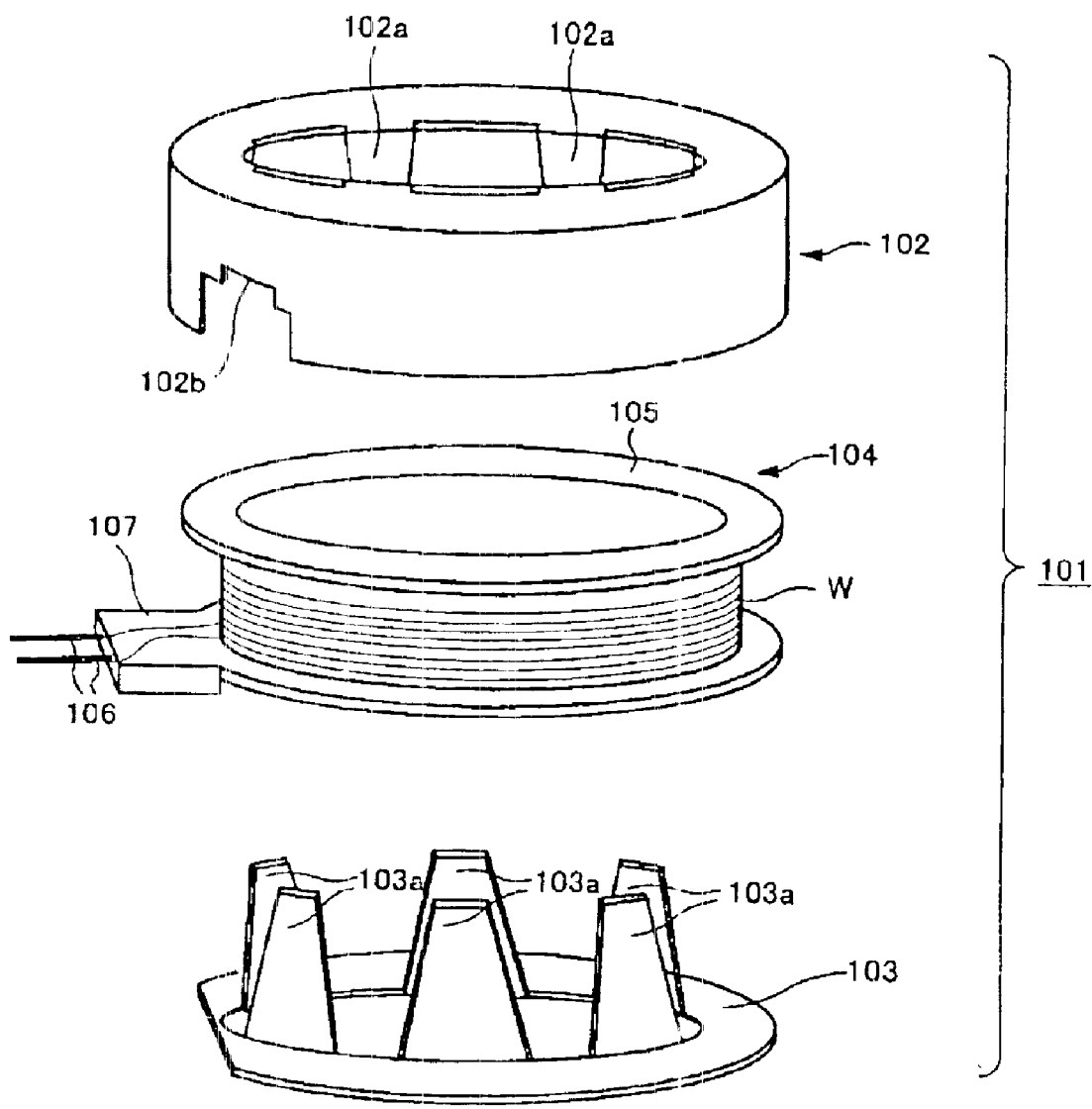
FIG. 10 shows an exploded view of the stator subassembly shown in FIG. 9.
Figure 11:
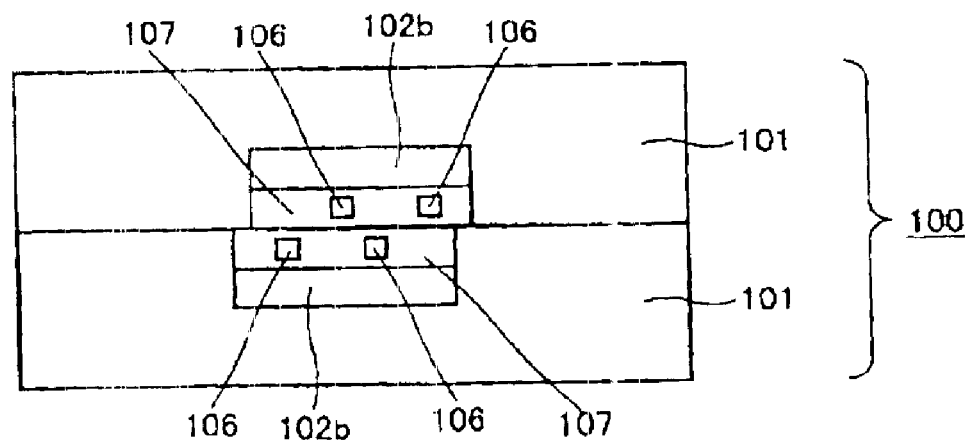
FIG. 11 shows a side view of the stator assembly shown in FIG. 9.
Figure 12:
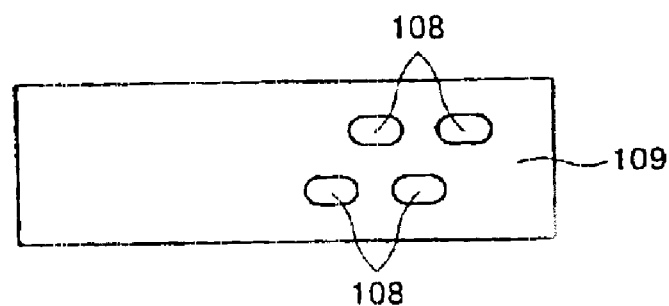
FIG. 12 shows a configuration of a conventional FPC.

The stepping motor 11 assembled by the above-described method is to be mounted on an apparatus such as a measuring instrument. An electrical connection between the stepping motor 11 and an apparatus on which it is mounted is made via a circuit board, for example, an FPC (flexible printed circuit) 32 having four connection holes 33 as shown in FIG. 8. Alternatively, the stepping motor 11 may be connected to a rigid circuit board not having flexibility, unlike the FPC 32.

Four terminal pins 21 projected on the two terminal blocks 20 and 20 are each inserted into the four connection holes 33 in the FPC and soldered therein. As described above, after the outer and inner stator yokes 15 and 15 are positioned relative to one another, the two terminal blocks 20 and 20 are again correctly positioned through adjustment to thereby eliminate their relative dislocation.

Therefore, it is not necessary to do any additional thing such as setting a diameter of each of the connection holes 33 to be relatively long so as to eliminate the dislocation of the terminal pins 21. Consequently, the above-described mechanisms do not involve any difficulty or complication such as inability of smooth soldering between the connection holes 33 and the terminal pins 21 due to the long diameter of each of the connection holes 33, thereby achieving an easy and highly-reliable electrical connection.

In brief, in this embodiment, the terminal block 20 can rotate by a predetermined angle as the bobbin 17 moves together with the terminal block projecting from the cutout 15b.

Consequently, this embodiment can eliminate the dislocation between the two terminal blocks 20 and 20 and 20 with the outer stator yokes 15 and 16 fixed at a predetermined relative location in a process of assembling the stator assembly 12.

Therefore, for example, it becomes easier to solder the terminal pins 21 to the FPC 32, achieving a highly-reliable and stable electrical connection between the stepping motor and the apparatus on which it is mounted.

The present invention is not limited to the above-described embodiment, and alternatively there may be any other variations and applications.

In the above-described embodiment, the terminal block 20 projects in such a manner as to project with a predetermined width in a direction substantially perpendicular to an axial direction of the bobbin 17. However, a shape of the terminal block 20 is not limited to the above-described example, and alternatively it may be any shape as long as it is possible to connect a magnet wire to the terminal pins 21, which in turn is connected to an external electrode. For example, it may be structured such that a width of a potion horizontally overlapping the outer stator yoke 15 is narrower than the width of the other portion (the protruding portion).

In the above-described embodiment, the PM stepping motor is used as an example for explanation. However, the present invention can also be applied to the other stepping motors and any other motor using a bobbin having a magnet wire wound therearound, such as spindle motors and servo motors.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention This application is based on Japanese Patent Application No. 2002-257199 filed on Sep. 2, 2002 and Japanese Patent Application No. 2003-118825 filed on Apr. 23, 2003, and including specification, claims, drawings and summary. The disclosure of the above Japanese Patent Application is incorporated herein by reference in its entirety.

What is claimed is:

1. A stator sub-assembly comprising:
   a coil bobbin composed of a cylinder having a winding of a magnet wire therearound, and a terminal block provided with terminal pins connected to lead wires of said winding; and
   coupled stator yokes housing said coil bobbin therein and having a cutout for allowing said terminal block to protrude therethrough, said cutout having a width adapted to allow said terminal block to circumferentially shift rotatably about a center of an axial direction of said coil bobbin.

2. A stator sub-assembly as claimed in claim 1, wherein a first angle made by two radii connecting a center of said coupled stator yokes to both circumferential ends of said terminal block is set to be smaller than a second angle made by two radii connecting said center of said coupled stator yokes to both circumferential ends of said cutout.

3. A stator sub-assembly as claimed in claim 2, wherein said first angle is set to be smaller than said second angle by an electrical angle of at least 10 degrees.

4. A stator assembly comprising two stator subassemblies, wherein
   said two stator subassemblies each comprise: a coil bobbin composed of a cylinder having a winding of a magnet wire therearound, and a terminal block provided with terminal pins connected to lead wires of said winding; and coupled stator yokes housing said bobbin therein and having a cutout for allowing said terminal block to protrude therethrough, said cutout having a width adapted to allow said terminal block to circumferentially shift rotationally about a center of an axial direction of said coil bobbin; and
   said two stator sub-assemblies are disposed such that respective terminal blocks of said two stator sub-assemblies abut on each other.

5. A stator assembly as claimed in claim 4, wherein a first angle made by two radii connecting a center of said coupled stator yokes to both circumferential ends of said terminal block is set to be smaller than a second angle made by two radii connecting said center of said coupled stator yokes to both circumferential ends of said cutout.

6. A stator assembly as claimed in claim 4, wherein said first angle is set to be smaller than said second angle by an electrical angle of at least 10 degrees.

7. A stator assembly as claimed in claim 4, wherein said respective terminal blocks of said two stator sub-assemblies are positioned so as to be circumferentially overlapped each other.

8. A stator assembly as claimed in claim 4, wherein said terminal block has a positioning mechanism.

9. A stator assembly as claimed in claim 4, wherein respective coupled stator yokes of said two stator sub-assemblies are disposed such that respective pole teeth of said respective coupled stator yokes are misaligned relative to each other by a predetermined electrical angle.

10. A motor having a stator assembly as claimed in claim 4.

11. A method of manufacturing a stator assembly including two stator sub-assemblies each comprising: a coil bobbin composed of a cylinder having a winding of a magnet wire therearound and a terminal block provided with terminal pins connected to lead wires of said winding; and coupled stator yokes housing said coil bobbin therein and having a cutout for allowing said terminal block to protrude therethrough and said cutout having width adapted to allow said terminal block circumferentially shift rotationally about a center of an axial direction of said coil bobbin, said method comprising:
   a process in which said two stator sub-assemblies are superimposed back-to-back such that respective coupled stator yokes of said two stator sub-assemblies are disposed in a predetermined relative position, with respective terminal blocks of said two stator sub-assemblies abutting on each other; and
   a process in which said respective terminal blocks are positioned so as to be circumferentially overlapped with each other in a state of said respective coupled stator yokes being fixedly attached to each other.

* * * * *